United States Patent

Norrby

[11] Patent Number: 5,904,341
[45] Date of Patent: May 18, 1999

[54] DEVICE FOR THE APPLICATION OF A TENSIONING FORCE IN A STRAP

[76] Inventor: Henry Norrby, Öjevägen 69, Järvsö S-820 40, Sweden

[21] Appl. No.: 08/913,601
[22] PCT Filed: Sep. 19, 1995
[86] PCT No.: PCT/SE95/01055
  § 371 Date: Sep. 18, 1997
  § 102(e) Date: Sep. 18, 1997
[87] PCT Pub. No.: WO96/29274
  PCT Pub. Date: Sep. 26, 1996

[30] Foreign Application Priority Data

Mar. 22, 1995 [SE] Sweden ................. 9501018

[51] Int. Cl.⁶ ............................................... B21F 9/00
[52] U.S. Cl. ................... 254/243; 254/214; 254/223; 254/226; 254/245; 254/254
[58] Field of Search .................... 254/214, 216, 254/217, 218, 221, 223, 226, 242, 243, 245, 250, 254, 262, 333

[56] References Cited

U.S. PATENT DOCUMENTS

| | | | |
|---|---|---|---|
| 362,600 | 5/1887 | Boyd | 254/214 |
| 2,946,563 | 7/1960 | Eaton | 254/217 X |
| 2,969,221 | 1/1961 | Harmes | 254/218 |
| 4,154,427 | 5/1979 | Hofmann | 254/223 X |
| 4,155,537 | 5/1979 | Bronson et al. | 254/223 X |
| 4,227,286 | 10/1980 | Holmberg | 254/218 X |
| 4,337,553 | 7/1982 | Fishcer | 254/242 X |
| 4,475,854 | 10/1984 | Ericsson | 254/223 X |
| 4,542,883 | 9/1985 | Rutzki | 254/223 X |
| 4,622,721 | 11/1986 | Smetz et al. | 254/218 X |
| 4,913,608 | 4/1990 | Royball | 254/218 X |
| 5,173,996 | 12/1992 | Chou | 254/223 X |
| 5,271,606 | 12/1993 | Kamper | 254/217 |

FOREIGN PATENT DOCUMENTS

| | | |
|---|---|---|
| 0 104 155 | 3/1984 | European Pat. Off. |
| 426799 | 2/1983 | Sweden |
| 437 342 | 2/1985 | Sweden |
| 9404550 | 2/1995 | Sweden |

Primary Examiner—Donald P. Walsh
Assistant Examiner—Emmanuel M. Marcelo
Attorney, Agent, or Firm—Terrance L. Siemens

[57] ABSTRACT

A strap tensioning device comprises a frame (1) with a rotatable reel (3) and a turnable command member (2). A ratchet wheel (43) is co-rotatively connected with the reel, the wheel cooperating with two spring-loaded latch elements (14, 29). When the command member (2) is turned out from the frame (1), the reel (3) is carried with it. At an opposed return movement, the reel (3) is blocked. A rotatable support roller (4) is arranged between the two side pieces (5, 5') of the frame (1). The reel (3) comprises a shaft (16) whose opposed ends are arranged in elongated holes (9). In this way, the reel (3) may be distanced from the support roller (4), whereby the device may be used for both strap tensioning and strap feeding.

12 Claims, 6 Drawing Sheets

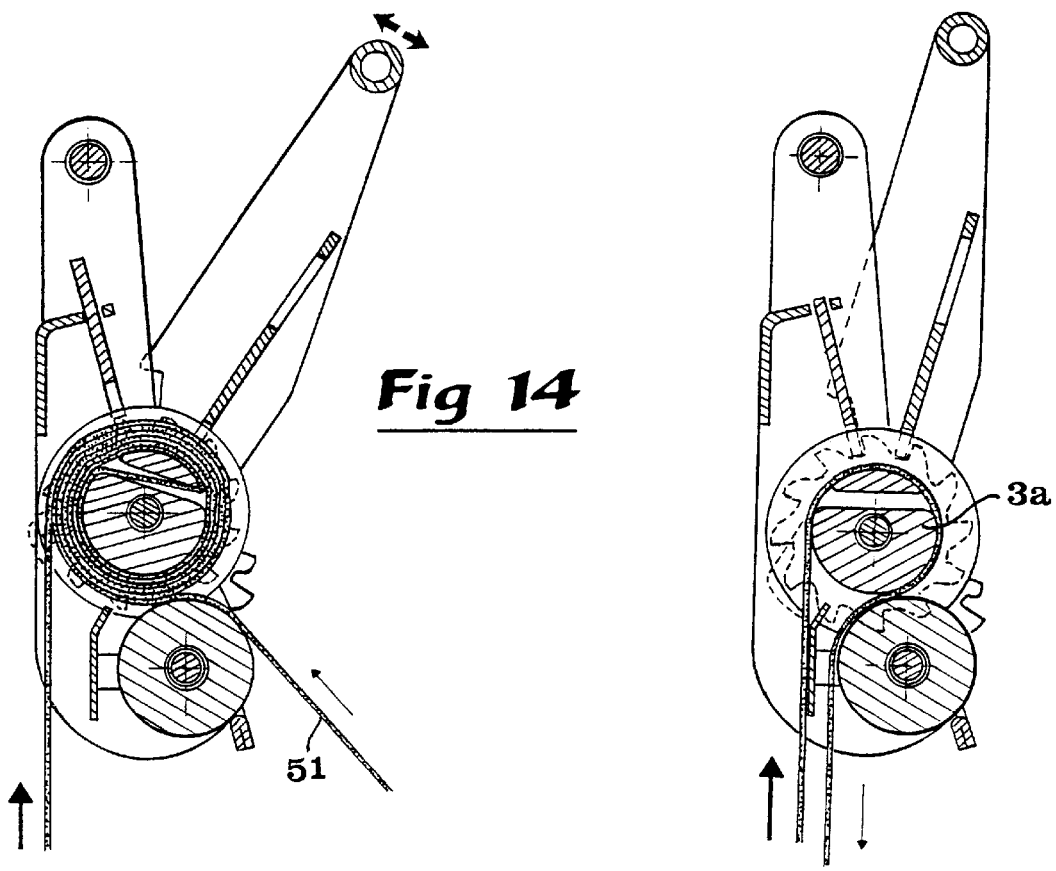
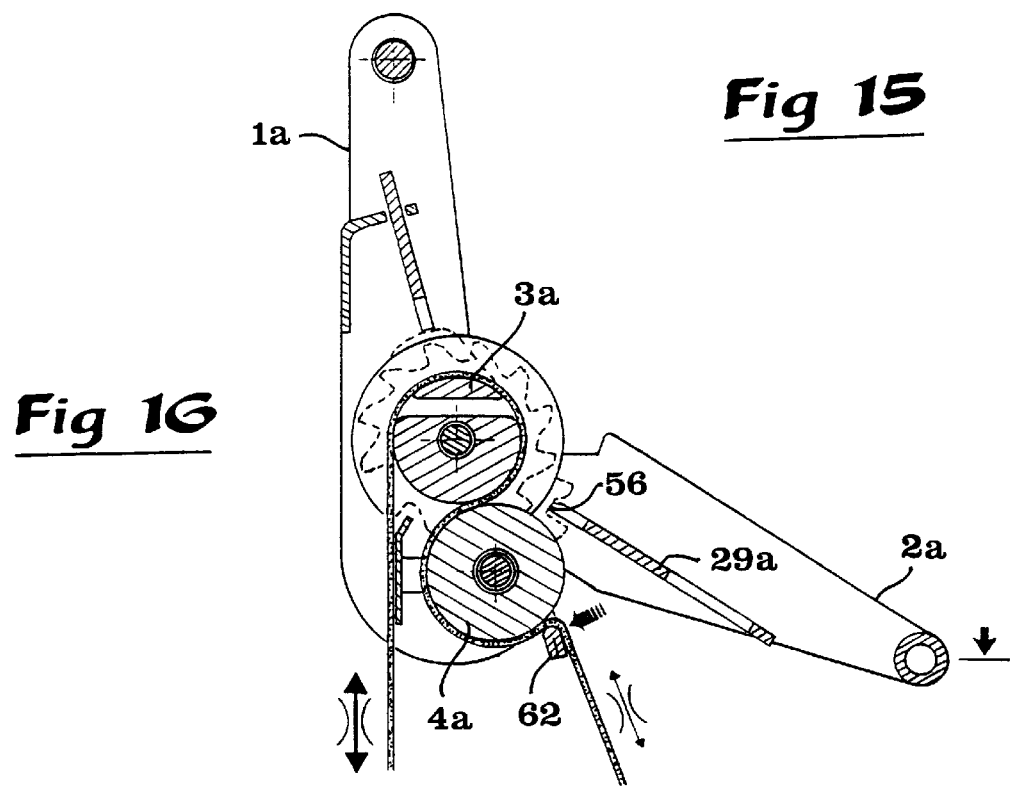

DEVICE FOR THE APPLICATION OF A TENSIONING FORCE IN A STRAP

TECHNICAL FIELD OF THE INVENTION

This invention relates to a device for the application of a tensioning force in a strap, including a frame having two separate side pieces between which is arranged a rotatable reel with a through slot into which a strap may be introduced, a manually grippable command means that is pivotably movable reciprocally around one and the same geometrical axis, around which the reel is rotatable, and at least one ratchet wheel which is co-rotatively connected to the reel and cooperates with two spring-loaded latch elements of which a first one is mounted on the frame and movable towards and away from the wheel's peripherical tooth rim, while the second one is mounted on the command means and equally movably towards and away from the tooth rim, the first latch element on one hand being held in engagement with the tooth rim and locking the wheel when the command means during a return movement is brought to turn into either one of two opposite directions relative to the frame, at the same time as the second latch element may freely ride outside the teeth of the rim, and on the other hand freely riding outside the teeth of the rim when the command means during a feeding movement is brought to turn into the opposite direction at the same time as the second latch element is in locking engagement with the tooth rim and carries the wheel, and thereby, also the reel.

PRIOR ART

Devices of the above mentioned sort have been known for a long time and are commercially available under the term strap tensioners. According to these known strap tensioners, also the command means comprises two separate side pieces or legs, which are interconnected via a cross-piece serving as a handle at that end of the means that is opposed to the reel. The distance between the two side pieces of the command means is so much larger than the distance between the two side pieces of the frame that interspaces are created between two cooperating side pieces, in which interspaces two ratchet wheels are accomodated. The reel consists of two equally shaped bodies which cross-sectionally are substantially shaped as segments of a circle, which bodies are led into holes in the ratchet wheels. By the fact that these holes have substantially the same cross-sectional shape as the two reel bodies, a co-rotative connection is achieved between these and the ratchet wheels at the same time as the reel bodies are kept at a distance from each other, thus forming a central, through slot for the strap. The two reel bodies or halves are held in place by means of locking pins placed on the outside of the side pieces of the command means. The teeth of the two ratchet wheels have on one hand an arched edge surface along which the respective latch element can freely ride from the root to the top, and on the other hand an edge surface extending substantially radially, against which the latch element is locked. The teeth are placed in such a way that the feed of the strap takes place when the command means is turned into a direction away from the frame, while the return movement without any strap feed takes place when the command means is turned in the opposite direction.

One embodiment of this known strap tensioner is shown in FIG. 4 of SE 8305190.4.

An advantage of the known strap tensioner is that it is constructionally simple and sturdy and, thereby, inexpensive to produce. However, a drawback is that the device in question is only possible to use precisely for tensioning a strap and, thereafter, to keep the strap in this tensioned state. This restricts the fields of use of the device to a high degree. Further, the two halves of the reel are in contact with comparatively long hole edge surfaces, at the two side pieces of the frame as well as the two side pieces of the command means. This implies that the friction between the reel and said side pieces becomes large; something that in practice results in that the turning of the command means, which is necessary for the feeding of the strap, requires a large force, in particular when the strap has begun to be tensioned, and in that the reel when disengaged requires considerable rotation assistance in order to come into the right position for pulling out the strap. Another shortcoming of the known strap tensioner is that the strap has to be wound upon the reel by a considerable length in order to attain a safe frictional grip.

OBJECTS AND FEATURES OF THE INVENTION

The present invention aims at removing the above mentioned shortcoming of the previously known strap tensioning device and developing it in the sense that the device—while maintaining a simple basic construction—is possible to use also for other purposes than only the tensioning of straps. Thus, a primary object of the invention is to provide a device which according to desire may be used for either winding a strap upon the reel for obtaining a conventional strap tension, or feeding the strap through the device, thereby bringing about a tensioning force in one part of the strap, while at the same time the other strap part is fed tensionless out of the device. Another object is to create a device whose frame and command means may be turned relative to the reel with a minimal friction and thereby a minimal power consumption when tensioning the strap. At the same time, when disengaged, the reel shall be capable of rotating with a low friction in order to facilitate the liberation of the strap from the reel. Still another object is to develop the device so that the friction locking of the strap relative to the reel is strongly reinforced during the initial stage of the strap tensioning.

According to the invention, at least the primary object is attained by the features as defined in the characterizing clause of claim 1. Further, preferred embodiments of the invention are defined in the dependent claims.

By the fact that a special support roller is arranged at the side of the reel or winder which is necessary for the strap tensioning, and by arranging these reels so that they, when required, may be distanced from each other, one and the same device may be used for both conventional tensioning of a strap and feeding of unlimited strap lengths through the device. Thus, in the latter case of use the device may be used for pulling, dragging or even lifting objects along large distances, which objects are connected to the free end of the strap.

FURTHER ELUCIDATION OF THE PRIOR ART

SE 9404550-7 previously discloses a force application device intended for straps, by which means a strap may be clamped in the nip between two rollers and be fed by the rotation of one of the rollers. However, in this case there is no possibility of winding up a strap upon one of the rollers, since both rollers lack any slot into which the strap could have been run. This involves that the tensioning of a strap and the retaining of the strap in a tensioned state during a longer period of time are not possible.

EP 104 155 discloses a similar device comprising two rollers of which one is driving and the other is movable in relation to the driving roller and accomodates a strap that may be squeezed into a nip between the rollers. However, nor according to this device does any of the rollers have a slot through which the strap could be run in order to thereafter be wound upon the roller in question. Therefore, the device can only be used for pulling or feeding the strap through the nip between the rollers, but not for a reliable tensioning of the strap in a wound-up state on the driving roller.

Downright strap tensioning or strap feeding devices with two rollers are also disclosed in SE 8203445-5 and in FIGS. 1 to 3 of SE 8305190-4. However, just as little as the above mentioned devices, may these ones be used for either strap feeding or strap tensioning in accordance with the wishes of the user.

BRIEF DESCRIPTION OF THE APPENDED DRAWINGS

In the drawings:

FIG. 1 is a perspective exploded view of a first embodiment of the device according to the invention, FIG. 2 is a front view partly shown in section of the same device in an assembled state, FIG. 3 is a vertical section as seen from the side, through the assembled device, more specifically shown during the initial winding-up of a strap upon the reel in connection with the functioning of the device as a strap tensioner, FIG. 4 is a similar section showing the device when the winding-up of the strap has been terminated, FIG. 5 is an analogous section showing the device in connection with its use for the through-feed of a strap, more specifically with the command means of the device shown pivoted-in against the frame, FIG. 6 is a similar section showing the command means pivoted out to an outer end position, FIG. 7 is a similar section showing the command means further pivoted in order to liberate the latch element of the frame from engagement with the ratchet wheel of the device, FIG. 8 is a side view of an alternative embodiment of the device, FIG. 9 is an exploded view corresponding to FIG. 1 and illustrating another alternative, further developed embodiment of the device according to the invention, FIG. 10 is a separate exploded view illustrating the winding reel for the device according to FIG. 9, FIG. 11 is a front view partly shown in section of the device according to FIG. 9, FIG. 12 is a side view of the device according to FIG. 9, and FIG. 13 are sections corresponding to FIGS. 3 to 6 and to 16 showing different functions of the device according to FIG. 9.

The components in the main embodiments that are analogous have the same reference numerals although the numerals in the embodiment according to FIGS. 9 to 16 have been supplemented by the letter "a".

DETAILED DESCRIPTION OF A FIRST EMBODIMENT OF THE INVENTION

Figure 1:
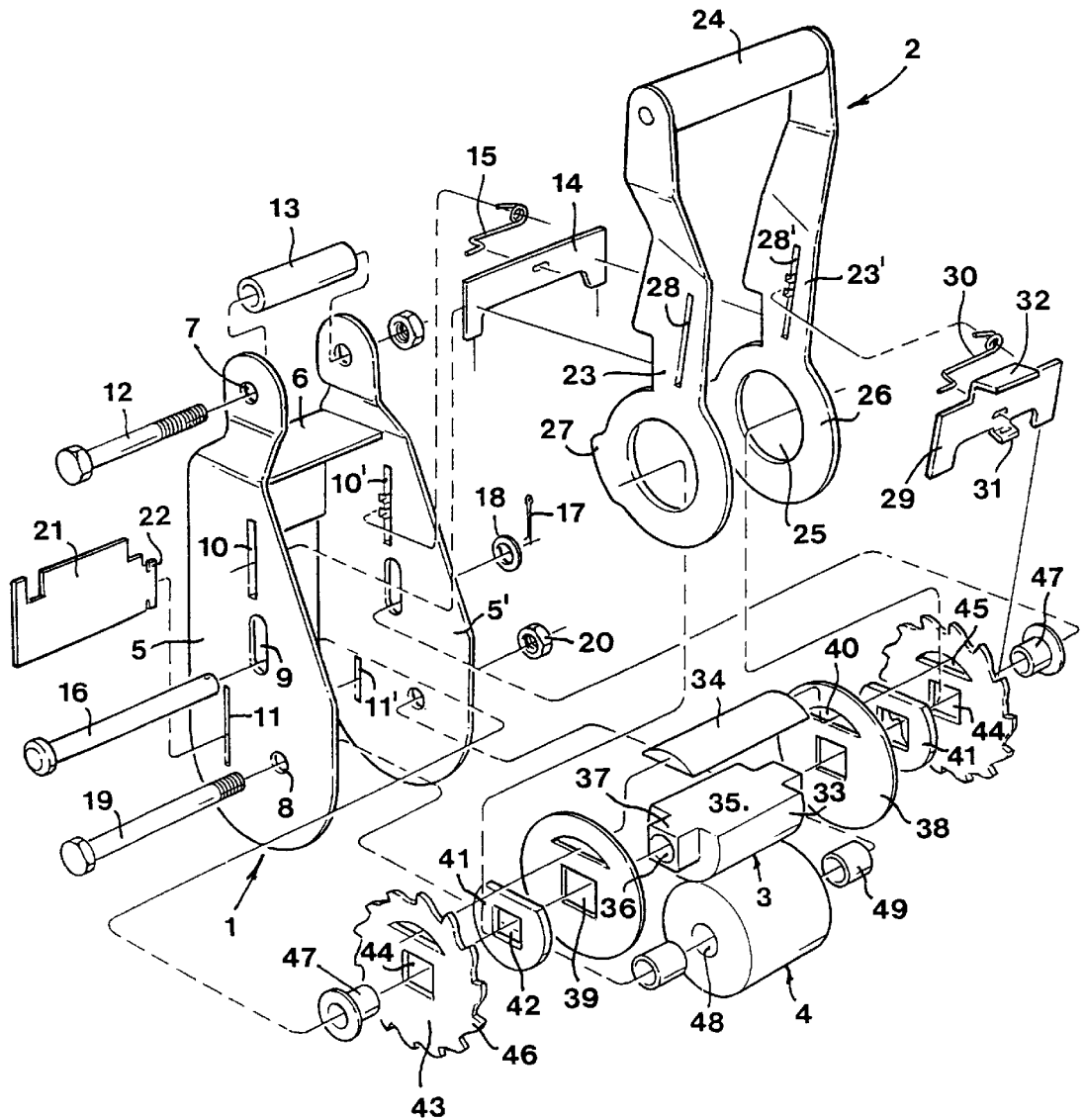

In FIG. 1 reference numeral 1 generally designates a frame and 2 a command means. A reel or winder is designated 3 in its entirety, while a support roller is designated 4.

The frame 1 comprises two separate side pieces 5, 5' which are interconnected via a cross-sectionally L-shaped cross-piece 6. In practice, the frame 1 can be made of one single, continuous piece of sheet metal (for instance with a thickness of about 2 mm), which after punching is bent into the shape as shown in FIG. 1. However, it is also possible to produce the side pieces as separate units which are joined with the cross-piece by welding. In each side piece are recessed a pair of circular holes 7, 8, an elongated hole 9 and two elongated slots 10, 10' and 11, 11', respectively. The holes 7 receive a nutted bolt 12 with an external sleeve 13 that serves as an attachment, e.g. for a coupling strap (see FIG. 5). In the slots 10, 10' is received a slide-like latch element 14 that is loaded by a spring 15 in the form of a bent wire spring, which may be mounted on a tumbling provided in connection with the slot 10'. The spring 15 strives to always press the latch element 14 downwardly in FIG. 1. In the elongated holes 9 is received a shaft or shaft pivot 16 for the winder reel 3. The shaft 16 is kept in place by a split pin 17, inside which is arranged a washer 18. In the holes 8 is received a bolt 19 that cooperates with a nut 20. The bolt 19 serves as an axis for the support roller 4. In the slots 11, 11' is received a guiding plate or metal sheet 21 which at its one end has a pair of tabs 22 that after the application of the guiding plate in the slots are bent in order to keep the plate in place.

The command means 2 comprises two side pieces or legs 23, 23' which at first ends are interconnected via a cross-piece 24 that serves as a handle. At their opposite ends, the legs 23, 23' have circular holes 25 recessed in widened portions 26 of the legs. The outer contour of these widened leg portions 26 are circular with the exception of a cam-forming, protruding part 27. In each leg there is a slot 28 and 28', respectively, for a second latch element 29 which is loaded by a wire spring 30, like the latch element 14. Contrary to the first latch element 14, the second latch element 29 has two bent parts 31, 32, of which the latter may be gripped by a finger.

The reel or winder reel designated 3 in its entirety, comprises on one hand a partly cylindrical main body 33, and on the other hand a thin secondary body 34, whose cross-section is shaped as a circle segment. The main body 33 has a planar surface 35 which is radially distanced from a barrel 36 receiving the shaft 16, said barrel leading to cross-sectionally polygonally shaped end pieces 37. The bodies 33, 34 are interconnected over gable plates 38, each of which having a hole 39, 40, whose shapes correspond to the cross-sectional form of the end pieces 37 and the ends of the secondary body 34, respectively. On the outside of the gable plates 38 are arranged bearing washers 41 whose contour form corresponds to the cross-sectional shape of the main body 33 and whose diameter is only somewhat smaller than the diameter of the holes 25. In each bearing washer is a square hole 42, through which the end piece 37 may be led. Outside each bearing washer 41 is arranged a ratchet wheel 43 with a square central hole 44 and a hole 45 shaped as a circle segment. Along the periphery of the wheel is a tooth rim 46 comprising a plurality of individual teeth, each of which having on one hand an arched portion and on the other hand a lateral, substantially radially directed portion. Into the barrel 36 may be inserted bushings 47 whose collars are located upon the outside of the ratchet wheels 43.

When the two reel bodies 33, 34 are connected with the gable plates 38 and the ratchet wheels 43, as shown in the other drawing figures, a slot 50 is created between the planar surface 35 and the equally planar surface on the inside of the secondary body 34 (see FIGS. 2 and 3), into which slot a strap may be run. It should also be evident that the two legs 23, 23' of the command means 2 are located between the gable plates 38 and the ratchet wheels 46, more precisely with the bearing washers 41 located in the circular holes 25.

The support roller 4 is substantially cylindrical and comprises a central through barrel 48 for the shaft 19. Bushings 49 are also introduced into this barrel 48. In this context, it may be pointed out that into the barrel 48 may also be inserted a distance pipe (not shown) whose length corresponds to the distance between the two side pieces 5, 5' of the frame 1. When tightening the nut 20, then the side pieces of the frame will be pressed against the ends of the distance pipe while attaining a stiffness of that end of the frame which is distal to the lateral piece 6. Under all circumstances, the support roller 4 is freely rotatable in relation to the shaft 19 and possibly existing distance pipes, respectively.

Figure 2:
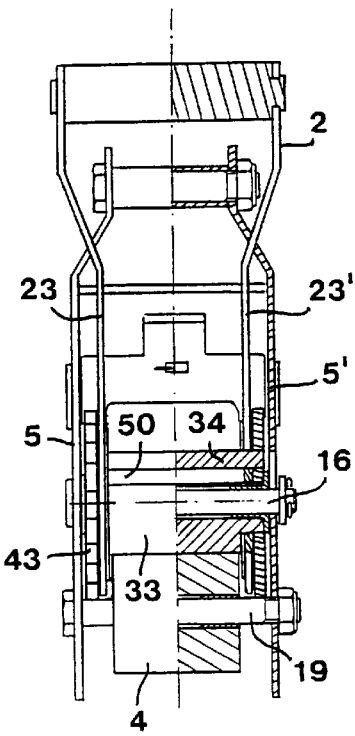

As may be clearly seen in FIG. 2, the distance between the two legs 23, 23' of the command means 2 is so much smaller than the distance between the two side pieces 5, 5' of the frame 1, that the ratchet wheels 43 go into interspaces between respective pairs of side pieces.

It should be particularly pointed out that the rotatable support roller 4 is placed at a larger distance from the attachment 13 than the winder reel 3. Thus, in the vertical state in which the device is shown in the drawings, the support roller 4 is placed in the region of the lower end of frame 1, while the winder reel is placed between the support roller and the attachment 13, although in the immediate proximity of the support roller. The spring-loaded latch element 14 is in turn placed between the winder reel 3 and the attachment 13.

THE DIFFERENT FUNCTIONAL STATES OF THE DEVICE

Before the two alternative functional states of the device are described in detail, is should be pointed out that the command means 2 works essentially in the same way as the corresponding command means of previously known strap tensioners. Thus, from a comparison between FIGS. 5 and 6 it emerges how the command means 2 may pivot by about 90° from a starting position near the frame 1 to a fully turned-out position in which the command means points perpendicularly to the frame. During this turning out, the latch element 29, carries the two ratchet wheels 43 and thereby also the winder reel 3, which is turned by a quarter of a revolution. Simultaneously, the latch element 14 rides upon the arched portions of the teeth 46. When the command means 2 thereafter, during its return motion, is turned back towards the frame, then the latch element 14 will lock or block the ratchet wheels by abutting against the laterally or radially directed portions of the teeth, whereby the winder reel is kept in its given position. Simultaneously, the other latch element 29 rides upon the arched portions of the teeth.

Figure 6:
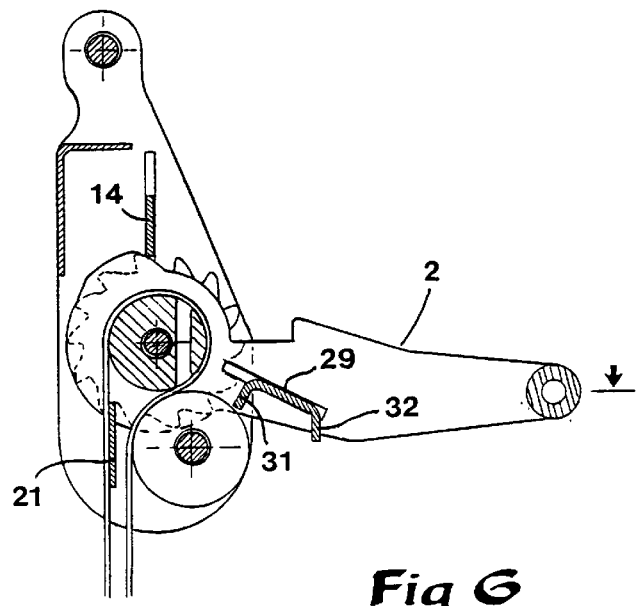
Figure 7:
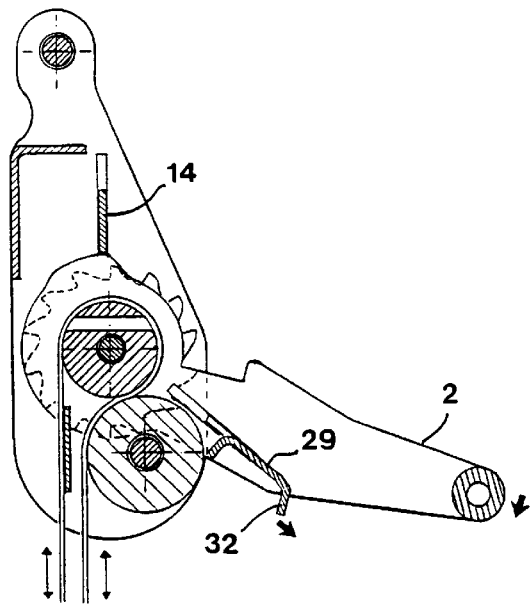

In FIG. 6 it may be seen how the turned-out end position of the command means 2 is determined by the protrusion 31 of the latch element 29, which protrusion in this position abuts against the support roller 4. In FIG. 7 it is shown how the command means 2 may be turned out by a further little distance from the end position shown in FIG. 6, namely by the fact that the latch element 29 is distanced from the winder reel by means of the second protrusion 32, against the action of the spring 30. By the fact that the command means in this way is turned by a further 10 to 20° from the end position, the cam-like protrusions 27 on the two legs 23, 23' of the command means will lift up the first latch element 14 and distance it from the tooth rims. In this way, the latch elements are liberated from their engagement with the tooth rims of the tooth wheels, whereby the winder reel 3 may rotate freely.

Figure 3:
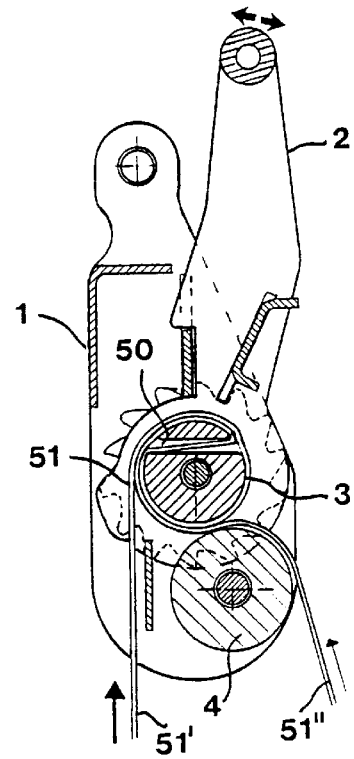
Figure 4:
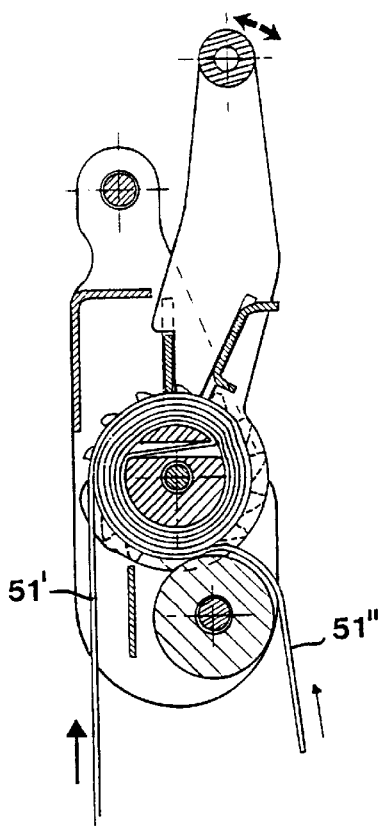

Reference is now made to FIGS. 3 and 4, which illustrate the conventional strap tensioning function of the device. FIG. 3 shows how a strap 51 initially has been run through the slot 50 and wound one revolution after a preparatory stretching of the incoming part 51' and after having been further pulled with its outgoing part 51" passing between the two rollers 3 and 4. In this working position, the frictional locking of the strap relative to the reel is considerably stronger than in previously known constructions, because the locking or the grip is strongly reinforced by the nip between the rollers 3 and 4. This nip brings about a frictional locking between the surface of the reel and the strap part 51' and between the strap parts 51' and 51", which radically increases the capability of the device to safely keep a considerable tensional force in the strap part 51'. When the command means 2 thereafter is repeatedly pivoted to and fro relative to the frame, the strap will be wound up on the winder reel as shown in FIG. 4, more specifically in double strap layers. Then the incoming part 51' is tensioned to the desired degree of tension, at the same time as the part 51" is shortened. By the fact that the shaft 16 of the winder reel 3 is arranged in the elongated hole 9, the winder reel may be distanced from the stationarily mounted support roller 4 and in this way it permits the gradual building-up of strap layers on the outside of the winder reel without clamping the strap between the rollers. In this context, it should be pointed out that the slots 10, 10' for the first latch element 14 are sufficiently long to make this latch element follow the strap wheels during this movement of the winder reel relative to the support roller. The other latch element 29 follows the winder reel by the fact that the command means 2 is connected in its entirety with the winder reel, but not with the frame.

It is evident that the incoming part 51' is only shortened to a limited extent when tensioning the strap, in that the strap initially is stretched to a relatively strained condition. Thus, the unwinding of the strap on the winder reel only attends to a short, although powerful, tensioning operation.

Figure 5:
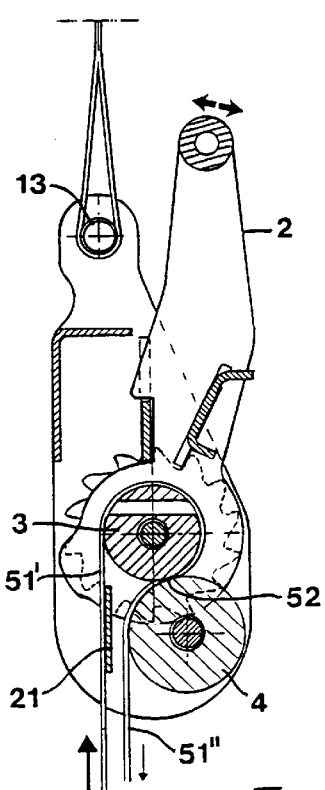

Reference is now made to FIGS. 5 and 6 which illustrate how the same device may also be used for feeding the strap through the device. In this case, the strap is laid in a single part around the winder reel and passes a nip designated 52 between the two rollers 3, 4. In this case, the outgoing part 51" passes between the support roller 4 and the guiding plate 21, which guarantees that the incoming and outgoing parts are kept apart within the device. When the command means 2 is set in reciprocal motions in the above described way, then the strap will be fed forwards step by step by means of the winder reel 3, against whose envelope surface the strap will be laid with a considerable frictional drag thanks to the clamping nip 52. In practice, this frictional contact is sufficiently large to make possible a pulling, trailing and/or even lifting of load objects of considerable weight connected to the free end of the strap part 51'. In this context, it should be noted that the power gear change of the device is considerable thanks to the fact that the moment arm which is represented by the distance between the shaft 16 and the handle 24 of the command means 2 is many times larger than the radius of the winder reel. In other terms, the user is capable of applying considerable force in the incoming strap part 51'.

BRIEF DESCRIPTION OF ALTERNATIVE EMBODIMENTS OF THE INVENTION

Figure 8:
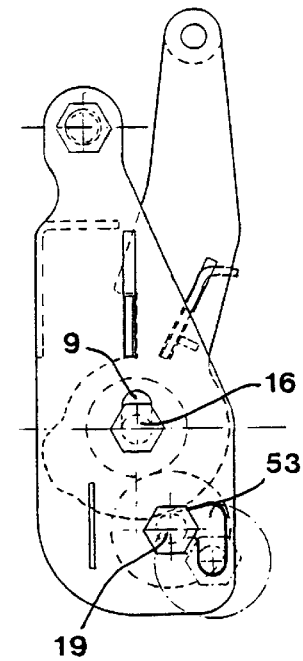

In FIG. 8 an alternative embodiment is illustrated, according to which the support roller is displaceable between two different adjustment positions at differing radial distances from the winder reel. In this case, the shaft 19 of the support roller is mounted with its two opposing ends in L-shaped guiding grooves 53. When the device is to be used as a strap feeder (cf. FIGS. 5–6 above), the shaft 19 is adjusted into the upper position according to FIG. 8, the two rollers 3, 4 still being so close to each other that a clamping nip for the strap is obtained.

When the device is to be used as a strap tensioner (cf. FIGS. 3–4 above), the shaft is moved downwardly to the lower position in the guiding grooves, whereby the support roller is distanced from the winder reel so that the strap may be wound up on the latter.

In the embodiment according to FIG. 8, the holes 9 for the shaft 16 of the winder reel need not necessarily be elongated, but only so large that the winder reel may be distanced by the short distance from the support roller being adjusted into the upper position that is necessary to introduce the strap between the rollers.

Reference is now made to FIGS. 9–16, which illustrate a further developed embodiment that is particularly suited for production in practice. Components and functions which do not substantially differ from the described basic embodiment will not be referred to underneath in detail.

Figure 9:
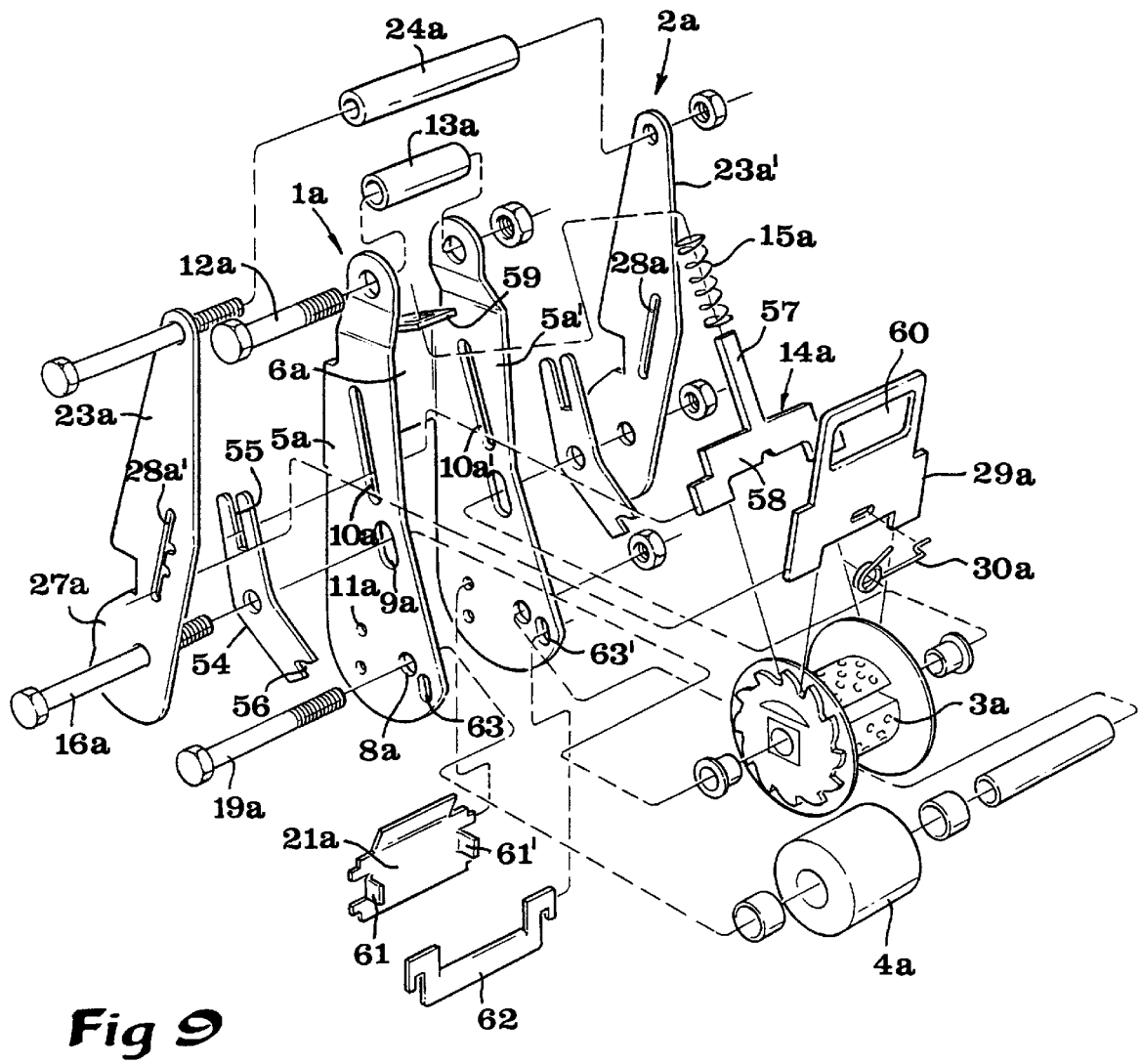
Figure 10:
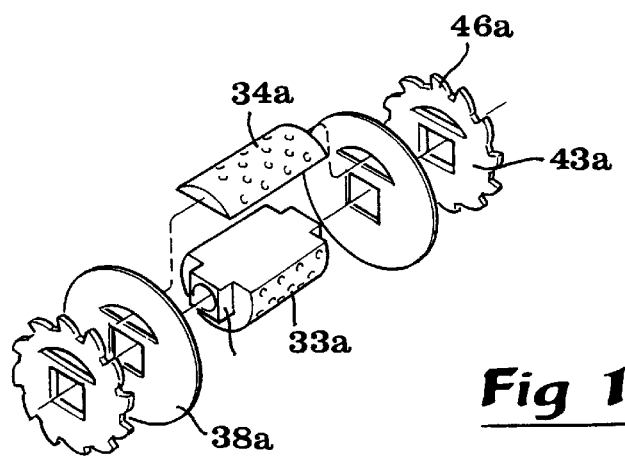
Figure 11:
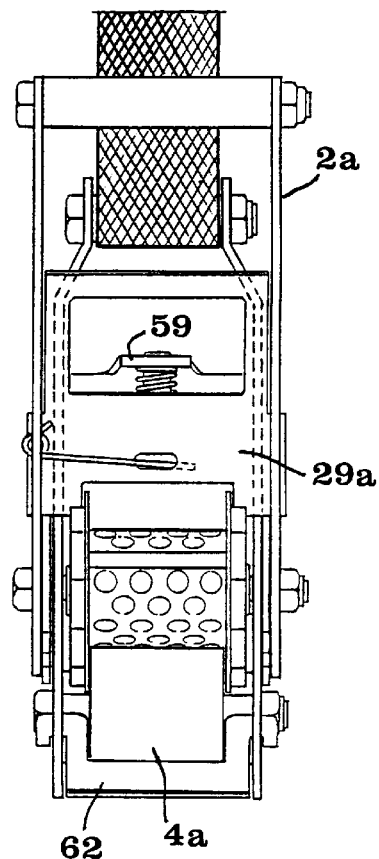
Figure 12:
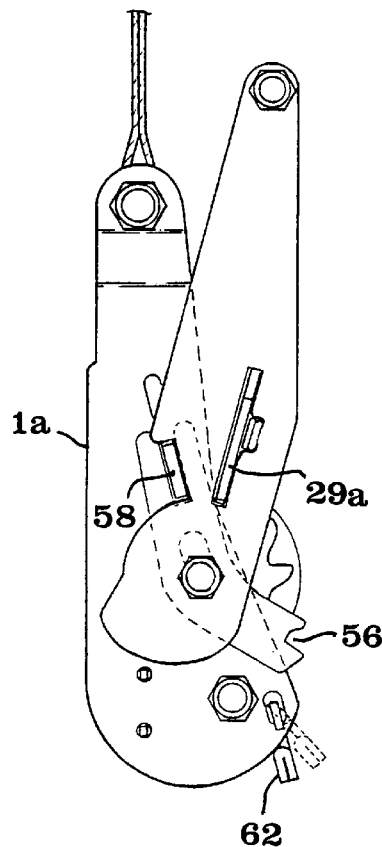
Figure 13:
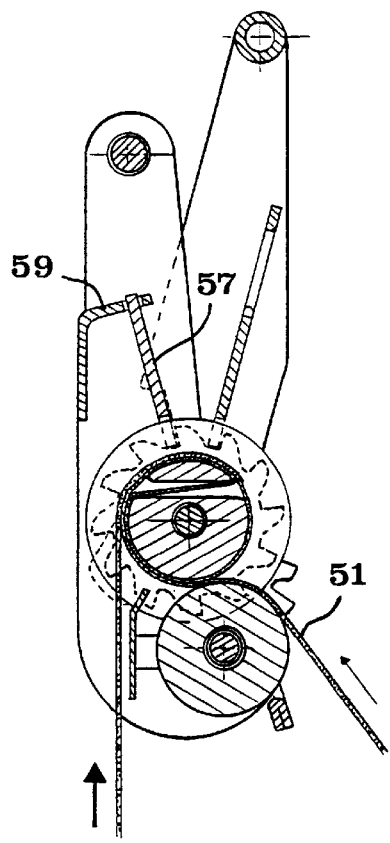

One difference between the further developed embodiment according to FIG. 9 and the basic embodiment according to FIG. 1 is that the former comprises a command means that is wider than the frame, i.e., the legs 23a, 23a' are arranged on the outside of the side pieces 5a, 5a' of the frame. Between each pair of a side piece and a leg is arranged a special intermediate arm 54 which is mounted on the shaft 16a. More specifically, the intermediate arm 54 is angle-shaped and has a central hole for the shaft 16a. At its one, upper end the intermediate arm has an elongated, slot-like recess 55 and at the opposite end there is provided a second, shallower recess 56. The first latch element 14a is substantially T-shaped in that it comprises a long and narrow lever 57 and a cross-piece 58 whose width is larger than the width of the frame. This implies that the free end portions of the cross-piece 58 protrude from the slots 10a, 10a' and engage into the upper recesses 55 of the intermediate arm 54. In the embodiment according to FIG. 9, the spring 15a consists of a compression spring, for instance in the form of a screw compression spring, which is mounted upon the lever 57 between the cross-piece 58 and a protrusion 59 provided with a hole, said protrusion being on the cross-piece 6a. By the fact that the intermediate arms 54 are mounted on the shaft 6a, they will follow the winder reel 3a in its movements relative to the frame. By the engagement of the cross-piece 58 in the recesses 55, it is guaranteed that the intermediate arms do not turn relative to the shaft 16a.

The second latch element 29a has the form of a plate with a large surface, in which is recessed a rectangular opening 60 into which the operator may insert one or more fingers. Thus, the latch plate 29a may be removed manually from the engagement with the tooth rims 46a of the ratchet wheels 43a.

In this case, the guiding plate 21a has two laterally separate tabs 61, 61' which are capable of guiding a passing strap laterally.

The embodiment according to FIG. 9 comprises a special U-shaped clamp 62 which by means of hook-shaped end portions may be mounted in holes 63, 63' in the lower portions of the side pieces 5a, 5a' of the frame. The function of the clamp 62 may be seen in FIG. 16. More specifically, the clamp may be used as an abutment for the strap 51 in connection with the lowering of a load that has been lifted by the device. The strap is then introduced between the clamp 62 and a point situated at "five o'clock" along the envelope surface of the support roller 4a, it being possible that the part of the strap that is below the clamp 62 is held by the operator's one hand. Thereafter, the command means 2a is turned down to a lower, inactive off position in which the latch element 29a is distanced from the ratchet wheels and locked in the lower recesses 56 of the intermediate arms 54, at the same time as the latch element 14a is distanced from the ratchet wheels by the protruding portions 27 on the legs 23, 23'. In this way a load that is connected to the other, outgoing part of the strap may be lowered in a controlled way, more specifically by the operator gradually slacking the strap.

An essential advantage of the embodiment according to FIG. 9 in comparison with the basic embodiment according to FIG. 1 is that the different components of the device in view of technical production are simple and easy to assemble. Furthermore, the use of the intermediate arms 54 guarantees that the winder reel and all components that follow it, maintain their interrelated geometry also when the winder reel is moved relative to the frame in connection with a strap being wound up on the winder reel (see FIG. 14). Further, when desired, the command means obtains a distinct fixed off-position in that the other latch element 29a may engage into the recesses 56 in the intermediate arms 54, at the same time as the latch element 14a is distanced via the cam parts 27a.

FEASIBLE MODIFICATIONS OF THE INVENTION

The invention is not restricted solely to the embodiments as described and shown in the drawings. Thus, it is theoretically possible to use only one ratchet wheel, although two ratchet wheels are preferred due to technical power distribution reasons. Further is it possible to provide the two rollers with gear pinions that engage into each other when the device is used for strap feeding, whereby equal rotation of the rollers in this functional state is secured. It is also possible to shape at least one of the two rollers with grooves, knurlings or other surface unevennesses which increase the friction of the rollers against the strap. With reference to the embodiment according to FIG. 8, it should be pointed out that the angularly shaped recesses or guiding grooves may be replaced by straight, long and narrow grooves which at their opposite ends have widened, circular holes, and the shaft of the support roller is divided into two spring-loaded halves, which at their outer ends have small parts that may be led through the straight grooves, and which inside the narrow parts have thicker parts whose shape corresponds to the shape of the hole. Then the shaft may be located either into the one or into the other pair of the hole and be led from the one to the other by the shaft halves being pressed against the action of the spring so that the thin shaft parts may be introduced into the straight, narrow grooves.

I claim:

1. A device for applying tensional force to a strap, comprising:
    a frame having opposed side members;
    a rotatable reel mounted between said side members, having engagement means for selectively releasably lockingly engaging a strap in a first mode of operation of the device, for winding said strap around said reel thereby retracting and retaining a length of said strap into said device;

a control means associated with said reel for rotatably driving said reel;

a ratchet and releasable first and second ratchet latch means associated with and actuated by said control means for rotating said reel in a first direction while selectively preventing rotation in a second direction;

a rotatable member mounted between said side members and spaced parallel to said reel to define a nip between said reel and said rotatable member; and a spacer means for varying the spacing between said reel and said rotatable member, including biasing means to urge said reel or rotatable member towards the other, to selectively frictionally engage said strap to said reel within a second mode of operation wherein an unlimited length of said strap may be fed through the device and tensioned by rotation of said reel.

2. A device according to claim 1, wherein said releasable locking engagement means comprises a slot in said reel for receiving a strap.

3. A device according to claim 1, wherein said side members include an elongated slot for mounting one of said reel and said rotatable member, whereby the position of said reel may be moved relative to said rotatable member.

4. A device according to claim 1, wherein said releasable ratchet latch means comprises first and second spring-loaded latch means, at least one toothed ratched ratchet means cooperatively connected to said reel and cooperatively associated with said first and second latch means, said first latch means being mounted on said frame and being moveable to and from the toothed portion of said ratchet means, said second latch means being mounted on said control means and moveable to and from the toothed portion of said ratchet means, said first latch means, on one hand, being engageable with said toothed portion and lockable with said ratchet means when said control means during a return movement is brought to turn in either of two opposite directions relative to said frame and during which said second latch means is in non-tooth-engaging relationship with said ratchet, and on the other hand, the first latch means being in non-tooth-engaging relationship with said ratchet means when said control means, during a strap feeding movement, is rotated in an opposite direction during which said second latch means is in a locking relationship with the toothed portion of said ratchet means.

5. A device according to claim 1, wherein said spacer means is a spacer shaft having opposed ends and wherein the opposed ends of said spacer shaft (9) are journalled in elongated apertures to permit said reel to be spaced from said support means (4) by a distance greater than the thickness of said strap.

6. A device according to claim 1, wherein said reel (3) includes a main body and a secondary body having end pieces, said main body being partially cylindrical and having a planar surface (35) radially spaced from a central barrel (36) mounting said shaft (16), said central barrel having, in cross-section, polygonally-shaped end members (37), said secondary body (34) having, in cross-section, a circular segment, said main and secondary bodies (33, 34) being interconnected over gable plates (38) having apertures (39, 40) with said apertures having a shape corresponding to the cross-sectional shape of the end pieces and of said secondary body, respectively, said ratchet wheel (43) being co-rotatively associated with at least said main body (33) by said polygonally shaped end members (37) being journalled in apertures having a shape corresponding to the shape of said polygonally shaped end members.

7. A device according to claim 1, wherein said frame (1) further includes attachment means (13) at one end, with said reel (3) being spaced from said attachment means, and wherein said rotatable member is mounted at a greater distance from said attachment means (13) than said reel (3).

8. A device according to claim 1, wherein said device further includes a guiding plate (21) in proximity of said rotatable member (4), said plate being adapted to hold an incoming strap portion (21') spaced from said rotatable member (4) and to hold an outgoing strap portion (51") in an abutting relationship to said rotatable member.

9. A device according to claim 1, wherein said rotatable member is a support roller, said support roller being mounted by bearings on a shaft (19) having opposed ends, said opposed ends being journalled by mounting holes or recesses (8, 53) in said side members (5, 5') of said frame (1)

10. In a device according to claim 9, wherein said recesses (53) for journalling said shaft are elongated recesses to permit movement of said shaft and consequently movement of said support means between adjustment positions at differing radial positions from said reel (3).

11. In a device according to claim 1, wherein said control means includes a pair of legs (23a, 23a') and a cross piece (24a), said control means being mounted outside said side members (5a and 5a') of said frame (1), an intermediate arm (54) having opposed ends and being mounted between said side members and said legs, said intermediate arm being mounted on said reel shaft (16a) and being adapted to follow said reel and having at its opposed ends first and second recesses, a first elongated recess (55) being adapted to receive a portion of said first latch means (14a), said side member of said frame having a slot with said portion of said first latch means protruding through said slot (10a) of said side member of said frame, said second recess (56) being adapted to receive a part of said second latch means (29a) to lock and keep said second latch means in an inactive position.

12. In a device according to claim 1, wherein said device further includes clamp means associated with said rotatable member (4a), said clamp means extending between said side members (5a,5a') of said frame (1a) and being adapted to form an abutment for said strap (51).

* * * * *